United States Patent [19]

Thomas

[11] Patent Number: 4,849,761
[45] Date of Patent: Jul. 18, 1989

[54] MULTI-MODE FEED SYSTEM FOR A MONOPULSE ANTENNA

[75] Inventor: Delmer L. Thomas, Camarillo, Calif.

[73] Assignee: Datron Systems Inc., Simi Valley, Calif.

[21] Appl. No.: 197,674

[22] Filed: May 23, 1988

[51] Int. Cl.⁴ ............................................. G01S 13/44
[52] U.S. Cl. ................... 342/153; 333/21 R; 333/115
[58] Field of Search ............................. 342/153, 333

[56] References Cited

U.S. PATENT DOCUMENTS

| | | | |
|---|---|---|---|
| 3,864,687 | 2/1975 | Walters et al. | 343/778 |
| 3,877,789 | 4/1975 | Marie | 350/370 |
| 4,081,803 | 3/1978 | Dempsey | 343/795 |
| 4,175,830 | 11/1979 | Marié | 350/400 |
| 4,396,921 | 8/1983 | O'Hara et al. | 343/895 |
| 4,446,463 | 5/1974 | Irzinski | 342/371 |
| 4,533,884 | 8/1985 | Hudspeth et al. | 333/26 |
| 4,627,442 | 12/1986 | Land | 128/736 |
| 4,630,059 | 12/1986 | Mory | 343/786 |
| 4,636,689 | 1/1987 | Mourier | 315/4 |

Primary Examiner—Thomas H. Taroza
Assistant Examiner—John B. Sotomayor
Attorney, Agent, or Firm—Edward A. Sokolski

[57] ABSTRACT

A monopulse antenna feed system utilizing multiple modes within the feed. In one embodiment a TEM mode and one or two TE.$_{11}$ modes are utilized in the antenna feed system to provide a data and a reference signal responsive to the one or two TE.$_{11}$ modes and to provide an error indicating signal responsive to the TEM mode that provides monopulse tracking operation. The relative phase of the TEM mode and the one or two TE.$_{11}$ modes is indicative of the off-axis orientation of a far-field source relative to the axis of the antenna system. The relative amplitude of the TEM mode is indicative of the angular departure the source from the axis.

1 Claim, 3 Drawing Sheets

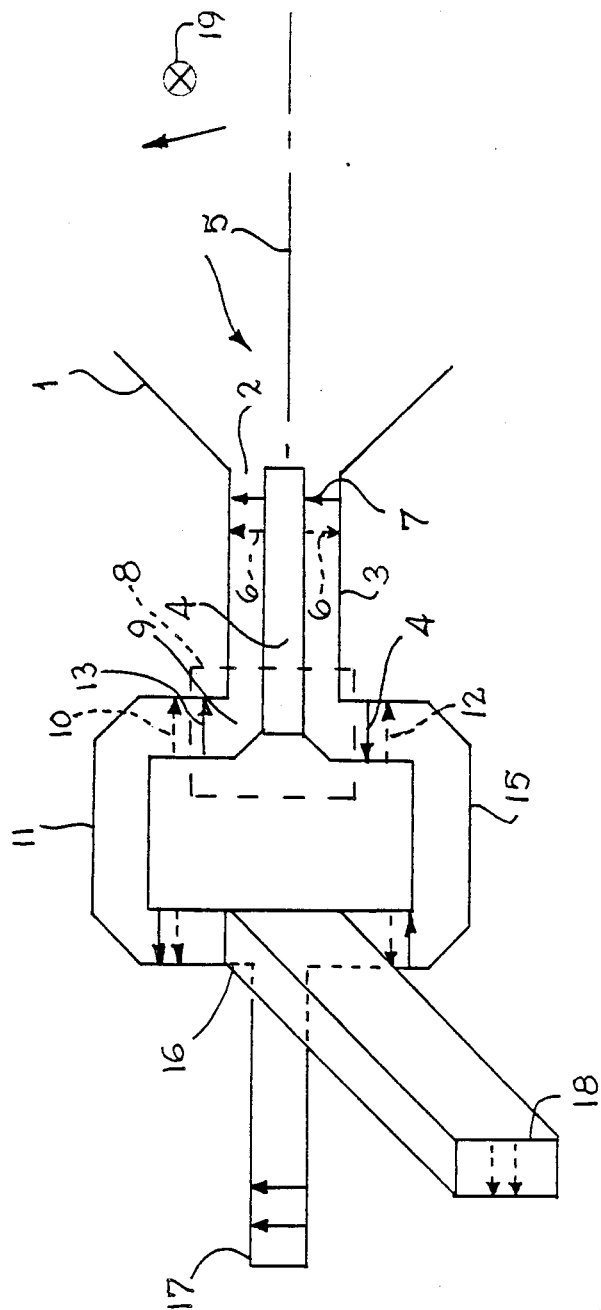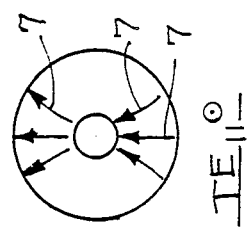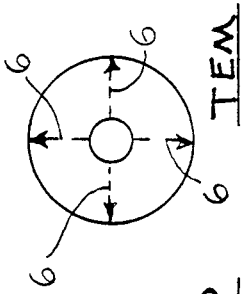
Fig. 1A
Fig. 1B
Fig. 1C

MULTI-MODE FEED SYSTEM FOR A MONOPULSE ANTENNA

BACKGROUND OF THE INVENTION

1. Field of the Invention

This invention pertains to radar and communication antenna systems. More particularly this invention pertains to monopulse antenna systems wherein the antenna system provides means not only for concentrating the electromagnetic radiation pattern of the antenna but also for tracking of objects or sources within the radiation pattern of the antenna.

2. Description of the Prior Art

Numerous antenna systems have been constructed which provide means for transmitting and receiving electromagnetic energy as well as for tracking a source of such energy within the electromagnetic far-field of the antenna. Some such systems utilize a mechanically nutating feed system which moves in a periodic manner so as to cause the radiation pattern of the antenna to nutate and thus provides a means for sensing the location of a source of electromagnetic energy within the radiation pattern of the antenna. The source of such electromagnetic energy may be either an object having an active transmitter located therein or an object that reflects electromagnetic energy incident thereon.

Monopulse antennas have been constructed which utilize a fixed-feed system consisting in some instances of two or more horns arranged such that by comparison of the amplitudes and/or relative phases of the signals received at each of the horns, one can obtain sufficient information for tracking and locating an object in the far-field of the antenna.

SUMMARY OF THE INVENTION

The present invention utilizes a single feed horn connected to a wave-guide that supports multiple modes of electromagnetic wave propagation within the guide. In the preferred embodiment, the wave-guide includes an axial conductor and supports a TEM mode as well as two orthogonally oriented $TE^\circ_{11}$ modes. The TEM mode generates a far-field pattern with an axial null. Each of the $TE^\circ_{11}$ modes generates a far field pattern with a maximum on axis. The phase of the TEM mode induced by electromagnetic radiation from an object offset from the central axis undergoes a phase reversal relative to one or both of the $TE^\circ_{11}$ modes as the object is offset to the opposite side of the axis. The TEM mode and the two $TE^\circ_{11}$ modes are separated within the feed system to provide outputs which are compared to track the object in the far-field of the antenna system.

BRIEF DESCRIPTION OF THE DRAWINGS

FIG. 1A functionally or schematically portrays an embodiment for tracking in one dimension which uses a coaxial wave-guide;

FIGS. 1B and 1C portray the TEM and $TE^\circ_{11}$ modes within the coaxial wave-guide;

DETAILED DESCRIPTION

Figure 2:
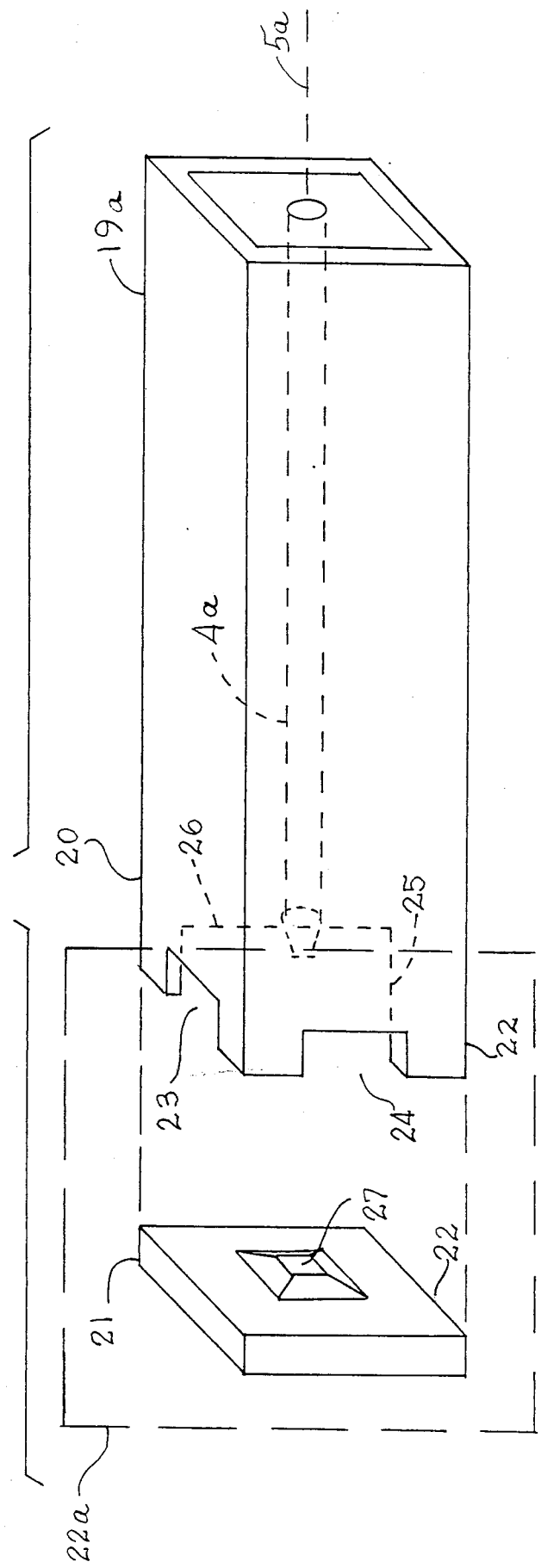
FIG. 2 depicts the mode transformer.

In the following description the designation $TE_{10}$ refers to an electromagnetic mode of propagation in a rectangular wave-guide. The designation $TE^\circ_{11}$ refers to a mode of propagation within a circular coaxial wave-guide or to a distortion of such mode within coaxial conductors where the conductors have shapes other than circular.

Referring now to FIG. 1A which is a diagram of the functional elements of an embodiment of the invention which utilizes the TEM mode and a single $TE^\circ_{11}$ mode for one-axis tracking of a source in the far-field of the antenna. For simplicity of description, the reception of an electromagnetic signal from a source 19 in the far-field of the antenna system will be described. The antenna system, however, may operate as either a transmitting or receiving antenna system (or both).

A feed horn 1 is excited at its throat 2 by electromagnetic waves in a coaxial wave-guide 3 having a central conductor 4 located along the axis 5 of the system. The coaxial wave-guide 3 supports the propagation of a TEM mode whose fields are substantially circularly symmetric about the central conductor 4 and have the electric components oriented in the manner represented by arrows 6 in the pictorial representation of the TEM mode in FIG. 1B and in FIG. 1C. Coaxial wave-guide 3 may have either a circular or substantially square cross-section. For the embodiment depicted in FIG. 1A, the orientation of the electric field in the $TE^\circ_{11}$ mode is represented by arrows 7 in FIGS. 1A and 1C. In appropriate circumstances feed horn 1 could degenerate simply to the opening at the end of coaxial wave-guide 3.

Referring again to FIG. 1A, the portion of the wave-guide structure enclosed by dashed line 8 is the mode transformer 9 which transforms the TEM mode in the coaxial wave-guide 3 into a $TE_{10}$ mode, represented by arrow 10, traveling in rectangular wave-guide 11 and a second $TE_{10}$ mode represented by arrow 12, traveling in rectangular wave-guide 15. Wave-guides 11 and 15 support only the propagation of the $TE_{10}$ mode. Mode transformer 9 also transforms the $TE^\circ_{11}$ mode in the multi-mode coaxial wave-guide 3 into a $TE_{10}$ mode represented by arrow 13 in wave-guide 11 and a second $TE_{10}$ mode represented by arrow 14 in wave-guide 15. As indicated in FIG. 1A, the relative phases of the $TE_{10}$ waves represented by arrows 13 and 14 are contrary to that of the waves represented by arrows 10 and 12.

The $TE_{10}$ waves in wave-guides 11 and 15 are combined in magic tee 16 so as to produce an output at the series port 17 of the magic tee responsive to the $TE^\circ_{11}$ wave in the multi-mode coaxial wave-guide 3 and to produce an output at the shunt port 18 of the magic tee responsive to the TEM mode in the multi-mode coaxial wave-guide. In other configurations, strip line or coaxial devices may be used in place of the magic tee to perform the function of the magic tee, that is to function as a hybrid combiner.

The phase of the signal at shunt port 18 (which is responsive to the TEM mode) is compared to the phase of the signal at serial port 17 to determine the positive or negative displacement of source 19 above or below axis 5. Because of the nature of the far-field of the antenna that is generated by the TEM mode in horn 1 and the far-field generated by the $TE^\circ_{11}$ mode in the horn, the output at shunt port 18 undergoes a phase reversal or shift of 180 degrees relative to the phase of the signal output at serial port 17 when the offset location of the far-field source 19 is reversed relative to axis 5. Accordingly, a comparison of the phase of the output of shunt port 18 with series port 17 can be used to obtain tracking information with respect to source 19.

Figure 3:
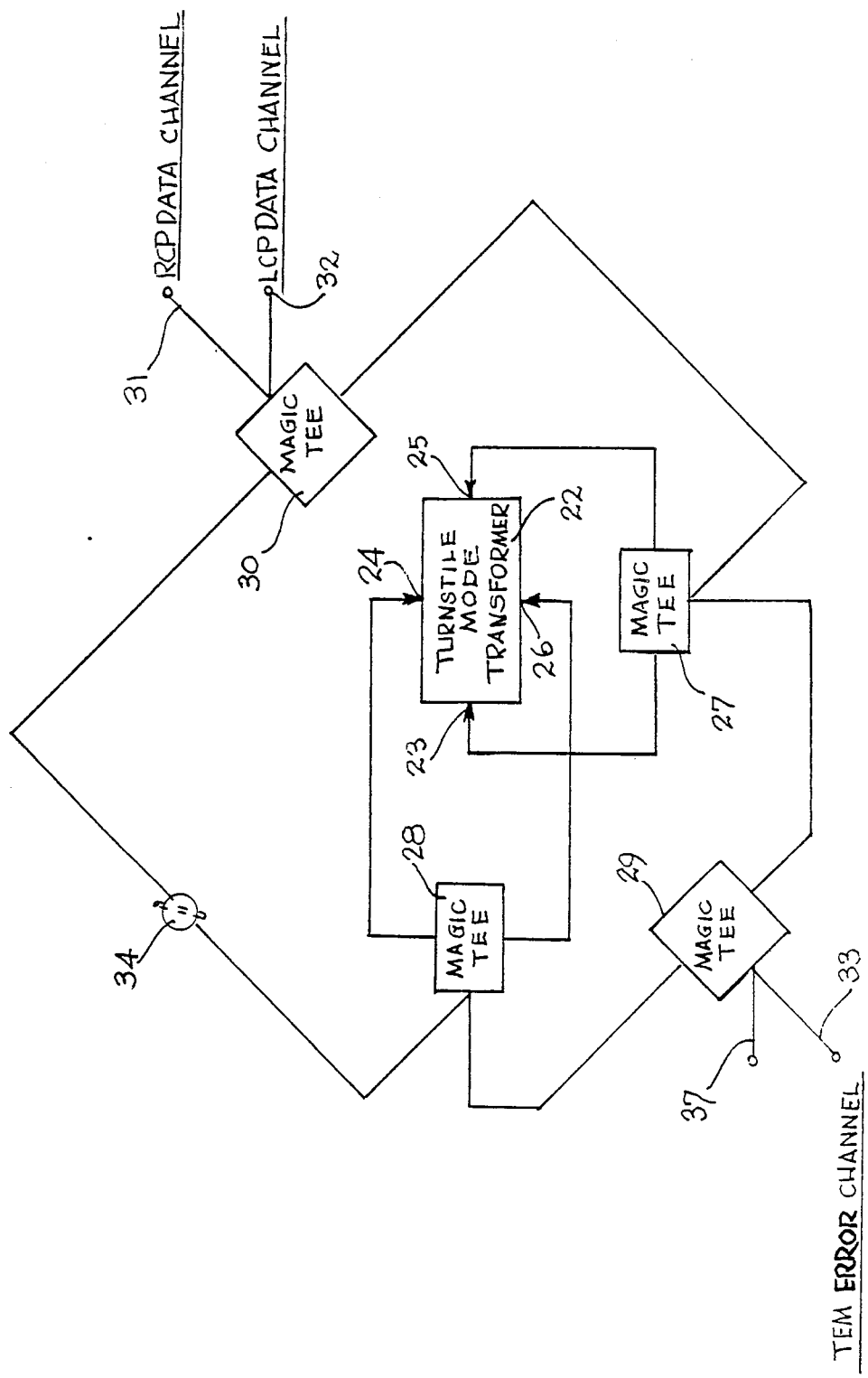
FIG. 3 is a functional block diagram of an embodiment of the invention for tracking in two-dimensions.

Two-dimensional tracking may be obtained simply by adding a second TE$^\oplus_{11}$ mode in the multi-mode coaxial wave-guide 3 and by the addition of related hardware namely an additional pair of rectangular wave-guides similar to wave-guides 11 and 15 but rotated 90 degrees about axis 5 relative to wave-guides 11 and 15. As depicted in FIG. 3, additional hybrid combiners or magic tees must also be added to obtain tracking in two dimensions. The orientation of the second TE$^\oplus_{11}$ mode is rotated 90 degrees about axis 5 so as to be orthogonal to the first TE$^\oplus_{11}$ mode.

FIG. 2 depicts the multi-mode coaxial wave-guide 19a and a mode transformer 22 which may be used to transform the TEM mode and each of the two TE$^\oplus_{11}$ modes into TE$_{10}$ modes propagating in the respective rectangular wave-guides. The rear end 20 of the multi-mode coaxial wave-guide 19a and end piece 21 (which are enclosed within dotted line 22a) together comprise a two-dimensional mode transformer 22. The two TE$^\oplus_{11}$ modes and the TEM mode within coaxial wave-guide 19a are transformed into TE$_{10}$ modes exiting from ports 23, 24, 25 and 26. The transformed TE$^\oplus_{11}$ mode having horizontal polarization exists from ports 24 and 26 and the transformed vertically polarized TE$^\oplus_{11}$ mode exits from ports 23 and 25. Components of the TEM mode appear in all four of the ports 23, 24, 25 and 26. A matching obstacle 27 on block 21, when assembled to the rear end 20 of wave-guide 19a, provides part of the matching for the mode transformer. The pyramid acts as a metered bend in the wave-guides. The heights of the rectangular wave-guides attached to parts 23, 24, 25 and 26 are adjusted to obtain matching of the TE$^\oplus_{11}$ modes to the TE$_{10}$ modes in the rectangular guides. The heights of these wave-guides are then tapered to a standard height for the junctions with the magic tees or hybrid combiners. By appropriate selection of the dimensions of coaxial wave-guide 19a and the central conductor 4a, a rough match of the impedances for the TEM mode also can be obtained that is sufficient for proper operation of the device. The two-dimensional mode transformer 22 is sometimes referred to herein as a turnstile mode transformer.

FIG. 3 is a functional diagram depicting the manner in which the outputs from ports 23, 24, 25 and 26 of the turnstile mode transformer 22 are connected to magic tees 27, 28, 29 and 30 to obtain two-dimensional monopulse tracking capability for this invention. The outputs from magic tees 27 and 28 that are responsive to the TE$^\oplus_{11}$ modes are combined in magic tee 30. As depicted in FIG. 3, a phase shifter 34 is inserted in one of the legs so as to add a 90 degree phase shift to one of the TE$_{10}$ waves responsive to one of the TE$^\oplus_{11}$ modes in the coaxial wave-guide. The addition of the 90 degree phase shift provides circular polarization. The outputs from magic tees 27 and 28 that are responsive to the TEM mode are combined in magic tee 29.

The sum and difference ports 31 and 32 from magnetic tee 30, provide right and left hand circular polarization in the axial far-field of the two TE$^\oplus_{11}$ modes in the horn 1. In order to obtain simultaneous tracking in two dimensions, the signal received from source 19 must be substantially circularly polarized and the system must be responsive to circularly polarized signals. If the 90 degree phase shift instead was omitted and the two TE$^\oplus_{11}$ modes were in phase with each other at the mouth of horn 1, then the system would be insensitive to offsets from axis 5 when the signal from the source happened to be polarized orthogonally to the radiation from the combined TE$^\oplus_{11}$ modes in the horn. The system also would be insensitive to offsets in a direction at right angles to the electric field of the combined TE$^\oplus_{11}$ modes.

In the two-dimensional tracking system, the output from the difference port 33 denoted "TEM Error Channel" in FIG. 3 is responsive to the TEM wave in guide 19a and may be compared to the output from port 31 or to port 32 to determine the position of source 19 relative to axis 5 in FIG. 1A. The output from sum port 37 is not used. The relative amplitude of the output from the TEM error channel represents the angular departure of source 19 from axis 5. The phase relationship between the output from the TEM error channel with respect to the output from either port 31 or port 32 corresponds to the rotational angular position of source 19 about axis 5 relative to a reference direction.

I claim:

1. A multi-mode feed system for a monopulse antenna for two-dimensional tracking of and/or communicating data to or from an object in the electromagnetic far-field of the antenna comprising:

first, second, third and fourth hybrid combiners each having first and second input ports and a sum and a difference port;

a feed horn;

a multi-mode wave-guide having a central coaxial conductor and having front and rear openings, the multi-mode wave-guide supporting a first electromagnetic wave propagation mode of the TEM type and second and third electromagnetic propagation modes of the TE$^\oplus_{11}$ type;

a mode transformer having a multi-mode port and first, second, third and fourth mono-mode ports, the multi-mode port being connected to the rear opening of the multi-mode wave-guide and the first, second, third and fourth mono-mode ports being connected respectively to the first and second input ports of the first and second hybrid combiners;

the front opening of the multi-mode wave-guide being connected to the feed horn;

the mode transformer transforming the TEM mode in its multi-mode port into first, second, third and fourth transformed TEM modes at its first, second, third and fourth mono-mode ports respectively and transforming the first TE$^\oplus_{11}$ mode at the multi-mode port into first and second transformed TE$^\oplus_{11}$ modes at its first and second mono-mode ports respectively and transforming the second TE$^\oplus_{11}$ mode at the multi-mode port into third and fourth transformed TE$^\oplus_{11}$ modes at its third and fourth mono-mode ports respectively, the first transformed TEM mode having a first phase relationship to the first transformed TE$^\oplus_{11}$ mode and the second transformed TEM mode having a second phase relationship relative to the second transformed TE$^\oplus_{11}$ mode, the first phase relationship being shifted approximately 180 degrees from the second phase relationship, and the third transformed TEM mode having a third phase relationship relative to the third transformed TE$^\oplus_{11}$ mode and the fourth transformed TEM mode having a fourth phase relationship relative to the fourth transformed TE$^\oplus_{11}$ mode, the third phase relationship being shifted approximately 180 degrees from the fourth phase relationship;

a phase shifter having an input and an output and exhibiting a phase shift of approximately ninety degrees for the transformed $TE^0_{11}$ wave passing therethrough;

the sum port of the first hybrid combiner being connected to the first input port of the third hybrid combiner and the difference port of the first hybrid combiner being connected to the input of the phase shifter, the output of the phase shifter being connected to the first input of the fourth hybrid combiner; the sum port of the second hybrid combiner being connected to the second input port of the third hybrid combiner and the difference port of the second hybrid combiner being connected to the second input port of the fourth hybrid combiner;

the sum (shunt) port of the third hybrid combiner providing a sum output responsive to the TEM mode and the outputs from the sum and difference ports of the fourth hybrid combiner providing first and second data outputs responsive respectively to either a right-hand circularly polarized combination of the first and second $TE^0_{11}$ modes or a left-hand circularly polarized combination of the first or second $TE^0_{11}$ modes, the sum output being compared with either of the first or second data outputs to provide monopulse tracking, the data output also providing means for communicating data.

* * * * *